United States Patent [19]

Schneider

[11] Patent Number: 4,585,937

[45] Date of Patent: Apr. 29, 1986

[54] HIGH EFFICIENCY FIBER-SHAPED DETECTOR

[75] Inventor: Richard T. Schneider, Gainesville, Fla.

[73] Assignee: The United States of America as represented by the Secretary of the Air Force, Washington, D.C.

[21] Appl. No.: 555,803

[22] Filed: Nov. 28, 1983

Related U.S. Application Data

[63] Continuation-in-part of Ser. No. 475,676, Mar. 15, 1983.

[51] Int. Cl.[4] .......................... G02B 6/02; H01J 5/16
[52] U.S. Cl. .................................. 250/227; 350/96.29
[58] Field of Search .......................... 250/227, 211 R; 350/96.29, 96.33

[56] References Cited

U.S. PATENT DOCUMENTS 3,299,306  1/1967  Kapany .
3,445,666  5/1969  Snaper ............................ 350/96.29
3,622,796  11/1971  Harris .
4,052,616  10/1977  Keller .
4,137,543  1/1979  Beneking .
4,214,916  7/1980  Felsher et al. .

Primary Examiner—Edward P. Westin
Attorney, Agent, or Firm—Donald J. Singer; Jacob N. Erlich

[57] ABSTRACT

A high efficiency fiber-shaped detector having a longitudinally extending core transparent to the wavelength of an incoming beam of electromagnetic radiation. Circumscribing the core and deposited thereon is an extremely thin layer of photosensitive material, an extremely thin layer of insulation and an extremely thin layer of reflective material. The photosensitive layer converts the electromagnetic radiation into an electrical signal which is transmitted to a processing system. Upon receiving the incoming beam of electromagnetic radiation, the reflective layer reflects this beam so that the beam passes through the photosensitive layer many times. Consequently, it is possible to provide a reliable indication of beam intensity. Modified embodiments of the above described detector also provide information with respect to the angularity and alignment of the input beam of electromagnetic radiation.

10 Claims, 9 Drawing Figures

OUTPUT

HIGH EFFICIENCY FIBER-SHAPED DETECTOR

STATEMENT OF GOVERNMENT INTEREST

The invention described herein may be manufactured and used by or for the Government for governmental purposes without the payment of any royalty thereon.

This application is a continuation-in-part of U.S. patent application Ser. No. 475,676 filed on Mar. 15, 1983.

BACKGROUND OF THE INVENTION

This invention relates generally to detectors for optical systems, and, more particularly, to a high efficiency fiber-shaped detector capable of detecting intensity, optical path angularity and optical alignment of incoming beams of electromagnetic radiation.

There currently exists many applications in which very wide field of view optical systems are required. One such application is a U.S. Air Force requirement for a very wide field of view optical seeker for air-to-air, air-to-ground and ground-to-air missiles. Other applications include industrial robots, space based sensors and security surveillance cameras.

It is common practice to meet the requirements of these applications with single aperture optical systems. However, since, in the single aperture optical system the focal length is tied to lens diameter (and field of view) the light gathering optics must either be very large, or else, the lens must be scanned in order to provide wide angle field of view surveillance. The size and complexity of systems based on this approach make it impractical for airborne applications. The size and focal length required for a very wide field of view single aperture lens that would function without scanning would of necessity, be too large to be accomodated on a missile. On the other hand, in order to provide scanning, optical domes, gimbals and Cassegrain optical systems would be required. For other applications the cost and complexity associated with single aperture lens systems frequently render that approach impractical.

The above enumerated disadvantages of single aperture optical systems are eliminated by utilizing multiaperture optic principles wherein the aperture is decoupled from focal length and physical space requirements are reduced. The concept of a multiaperture optical system is based on the biologically evolved invertibrate (insect) eye. The invertebrate multiaperture eye and its development and relationship to a mechanical model implementing it are described in detail in the papers *Signal Processing In The Insect Eye* by J. F. Butler, R. C. Wilkinson, R. T. Schneider and J. F. Long and *A Mechanical Model Of The Insect Eye* by R. T. Schneider, E. E. Carroll, Jr., G. R. Dalton and J. F. Long presentd at the IEEE SOUTHEASTCON, 1982, Sandestin, Destin Florida, Apr. 4–7, 1982 and published in the IEEE PROCEEDINGS thereof. Further details are described in the University of Florida draft Final Report Volume II entitled *Multiaperture Optics* by Richard T. Schneider, dated 1 Dec. 1982, which report is incorporated herein by reference and is being published as an Air Force Armament Laboratory Formal Report.

The cited references describe two types of multiaperture optics that are useful for the applications indicated above. They are the apposition eye and the neural superposition eye. It is well known and has been demonstrated in the above cited references that image formation can be achieved either by interference or collimation. The latter is mostly used for high energy radiation, where the corresponding wavelengths are too short to be practical for interference systems.

The apposition insect eye is a collimation system. A collimator is often lensless, e.g., for neutrons or gamma particles. Even if a lens is used like in an autocollimator, the property of light which is utilized is the fact that it propagates in a straight line. The apposition eye uses lenses not for image formation, but for definition of the field of view for an individual eyelet. The location of the image point is entirely determined by the fact that the light propagates in a straight line. One consequence of this is the decoupling of the focal length of the eye from the field of view of the eye. The field of view is determined by the curvature of the surface of the multiaperture eye. For the single aperture eye this surface is already utilized for determination of the optical properties of the lens rather than for definition of the field of view which is now determined by the focal length (for a given f-number and a given eye diameter). The consequence is that in the case of the multiaperture system the focal length can be kept extremely short, which provides for a minimum depth for the total eye.

Another difference between interference and collimating optics is the curvature of the image plane (retina). For the apposition eye the curvature of the retina is always convex while it is concave for a single lens eye. If the multiaperture system is to be mounted on a surface (like the skin of a missile) the convex curvature makes this possible. The disadvantage of the apposition eye is the limited resolving power which, however can be made good by using a very large number of eyelets.

The neural superposition eye is no longer a collimation system but an interference system. It forms a small image. Since an image is formed, the question is why not use one lens only and obtain better resolving power. Obviously the neural superposition eye should be only used for special applications where details of the image are not important. This eye necessarily must be target oriented and not detail oriented. If it is necessary to identify a target as such and to determine where it is located rather than to describe differences in similar targets then the neural superposition eye has advantages over the single aperture eye. The advantages discussed above for the apposition eye still apply to some degree for the neural superposition eye, namely the decoupling of the field of view from the focal length and the convex shape of the retina.

Based on the above discussed fact, it can be seen that multiaperture optics can be used for specialized applications where the location and recognition of the target is more important than detailed description of the target. Such applications would include all optical systems having space and complexity limiting requirements as with the air-to-air missiles, air-to-ground missiles, ground-to-air missiles, robots, space based sensors, security surveillance cameras mentioned above.

An example of an integrated multiaperture optical system that provides viewing of and object identification in a very large scene without scanning of the light gathering optics is described in U.S. patent application Ser. No. 475,676 filed on Mar. 15, 1983 by the present inventor together with James F. Long. This system has the advantages of having a very large field of view without scanning; greatly reduced space requirements; large scale integrated circuit construction; reduced complexity and manufacturing costs; and improved performance for certain applications. It is particularly suited to U.S. Air Force optical missile seeker applications.

Further, the above-mentioned integrated multiaperture optical system comprehends multiaperture light gathering optics that projects received electromagnetic wave energy onto a detection layer. The output of the detector layer is correlated and then processed by a data processing stage to identify objects of interest in a scene being viewed by the light gathering optics.

The multiaperture light gathering optics includes an array of eyelets, or lens apertures, each viewing a discrete region of the scene under surveillance. The lens aperture members can have optical configuations and orientations that effect either apposition or neural superpostition imaging on the detector layer. The array can consist of either type lens aperture members or a combination of them.

The detector layer comprises a separate detector for each lens aperture member and each detector has a multiplicity of elements with each element having a separate output.

Correlation is achieved in a correlation layer adjacent to the detector layer. It contains a memory for each detector element. There is an amplifier and analog/digital converter combination for each detector element that conditions and loads data received by the detector element into its associated correlation layer memory. Certain memories are interconnected in accordance with a hard wired program to effect neural superposition image processing.

A processing layer adjacent to the correlation layer includes a memory matrix that accesses the correlation layer memories. The data processing layer also includes microprocessor circuitry that processes the data contained in the memory matrix in accordance with an object recognition routine and in accordance with algorithms for apposition and neural superposition modes of operations.

The system is implemented by using very large scale integrated circuit techniques whereby correlation layer memories can be physically located directly below their associated detector elements.

A major undertaking in the development of the above-described optical system involves providing an acceptable, high efficiency detector for use therein. Heretofore, conventionally available detectors were incapable of providing the high efficiency necessary for effective operation of such an integrated multiaperture optical system as described above.

SUMMARY OF THE INVENTION

The present invention overcomes the problems encountered in the past and as set forth hereinabove by providing a high efficiency fiber-shaped detector which is capable of detecting or measuring the intensity, optical path angularity, or alignment of an incoming beam of electromagnetic radiation.

The high efficiency fiber-shaped detector of the present invention finds utility in numerous types of optical systems wherein it is necessary to determine either intensity, an angular relationship, or alignment of an incoming beam of electromagnetic radiation. Although this particular detector can be utilized with many types of optical systems, its primary use to date has been within an optical system having multiaperture light gathering optics. An example of such an optical system can be found in the above-referred to U.S. patent application Ser. No. 475,676. In such a system a multiaperture optical array is formed by a plurality of lenses, supported upon a detection layer by tubular supports, a correlation layer and a processing layer. Each of the individual lenses form an image on the detection layer and the detection layer contains therein a plurality of individual detectors, typically 100 per lens. It is the detection layer which is of primary concern with the present invention and, more particularly, it is the detectors which make up the detection layer to which the present invention is directed.

More specifically, the detection layer is made up of a multiplicity of the high efficiency fiber-shaped detector elements of the present invention. Each of the detectors is generally of cylindrical configuration (although in some instances a wedge-shaped configuration may be desirable) and made up, preferably, of an optical fiber on which is deposited a photosensitive layer, an insulating layer, and a reflecting layer. Typical diameters of one such optical detector is generally approximately 100 micrometers. A large number of these detectors of the present invention are adhered together in order to form the detector layer of a typical optical system such as described above.

Upon receipt of an incoming beam of electromagnetic radiation, the photosensitive layer provides a signal to an amplifier in the correlation layer. The output of the amplifier is analog to digital converted by an analog/digital converter and read into a memory. All memories in the correlation layer are accessed by the programming layer memory matrix. The amplifier, analog/digital converter are fabricated in accordance with very large scale integrated circuit techniques and are physically positioned beneath the detector layer.

In order to obtain extremely high efficiency operation, the detector of the present invention incorporates therein uniquely designed layered material in order to retroreflect an incoming beam of electromagnetic radiation into the photosensitive layer. As a result, the output signal obtained from the photosensitive layer provides an accurate indication of the intensity of the incoming beam of electromagnetic radiation. In other words, as an incoming beam of electromagnetic radiation enters the central or transparent core (perferably an optical fiber) and travels through the photosensitive layer, part of its energy is converted into an electrical signal. The remainder of the electromagnetic radiation is reflected by the reflecting layer and reenters the transparent core, traverses it, and interacts with the photosensitive layer once again, and does so in a continuing fashion. Since the photosensitive area of the detector is several times larger than the area which is available for beam intersection, this ensures high detection efficiency at maximum resolving power. Consequently, it allows for the building of a detector which is extremely small. The leads carrying the signal are attached to the lower end of the detector and, therefore, do not interfere with the collection of electromagnetic radiation. A large number of these detectors are combined into a bundle in order to form a focal plane array.

In many instances it is desirable to detect not only intensity, but also angularity of the optical path followed by an incoming beam of electromagnetic radiation as it intercepts the detector. This is accomplished by modifying the detector of the present invention described above. Such an embodiment of the present invention includes a transparent core, preferably in the form of an optical fiber, onto which are deposited a plurality of spaced apart photosensitive segmented layers or segments. Each of these photosensitive segments are spaced apart from each other so that each individual photosensitive segment provides an independent signal based upon its interception by an incoming beam of electromagnetic radiation. In this embodiment of the present invention there is no need for a reflecting layer since the major concern of this embodiment of the detector is in determining the angular relationship of the incoming beam of electromagnetic radiation. Depending upon the angle at which the optical path of the incoming beam of electromagentic radiation intercepts the detector, this incoming beam will pass through one or more of the photosensitive segments deposited upon the transparent core of the detector. By analyzing the output signals from each of the segments of photosensitive material, it is easy to ascertain the exact angular relationship of the optical path of the incoming beam of electromagentic radiation with respect to the central, longitudinal axis of the detector.

In other instances it is necessary to accurately and quickly ascertain the alignment of the incoming beam of electromagnetic radiation with respect to the detector. Another embodiment of the present invention provides for such alignment detection by incorporating within the detector a transparent core, preferably in the form of an optical fiber, which is centrally divided by means of a mirrored surface passing through the central, longitudinal axis of the core. In addition, a plurality of semicircular photosensitive segmented layers or segments are deposited upon the transparent core in spaced apart relationship with respect to one another. In this embodiment of the present inventon not only are each pair of semicircular photosensitive segments spaced apart from one another along the longitudinal axis of the detector, but also each of the semicircular segments are spaced apart from each other circumferentially so as to be separated by the centrally located mirrored surface.

Therefore, when an incoming beam of electromagentic radiation passes directly in line with the longitudinal axis of the transparent core, either no signal or equal intensity signals are detected from the photosensitive segments. However, if the incoming beam of electromagetic radiation is out of alignment with the central, longitudinally extending axis of the transparent core, the beam will strike some photosensitive segments or not others. In addition, this beam will also be reflected from the mirrored surface and pass through an additional number of phtosensitive segments so that, in effect, the detector will be outputting a signal of greater value from one half the detector than from the other half of the detector. Consequently, when alignment detection is required it becomes easy to ascertain when the input beam of electromagentic radiation is out of alignment with the central, longitudinal axis of the transparent core of the detector.

It is therefore an object of this invention to provide a fiber-shaped detector capable of highly efficient and reliable operation within an optical system.

It is another object of this invention to provide a high efficiency fiber-shaped detector capable of effectively determining the intensity of an incoming beam of electromagnetic radiation.

It is still another object of this invention to provide a high efficiency fiber-shaped detector which is capable of measuring the input angle followed by a beam of electromagnetic radiation.

It is a further object of this invention to provide a high efficiency fiber-shaped detector which is capable of determining the alignment of an incoming beam of electromagnetic radiation.

It is still a further object of this invention to provide a high efficiency fiber-shaped detector which is economical to produce and which utilizes conventional, currently available components that lend themselves to standard, mass producing, manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWINGS

DETAILED DESCRIPTION OF THE PREFERRED EMBODIMENTS

Figure 1:
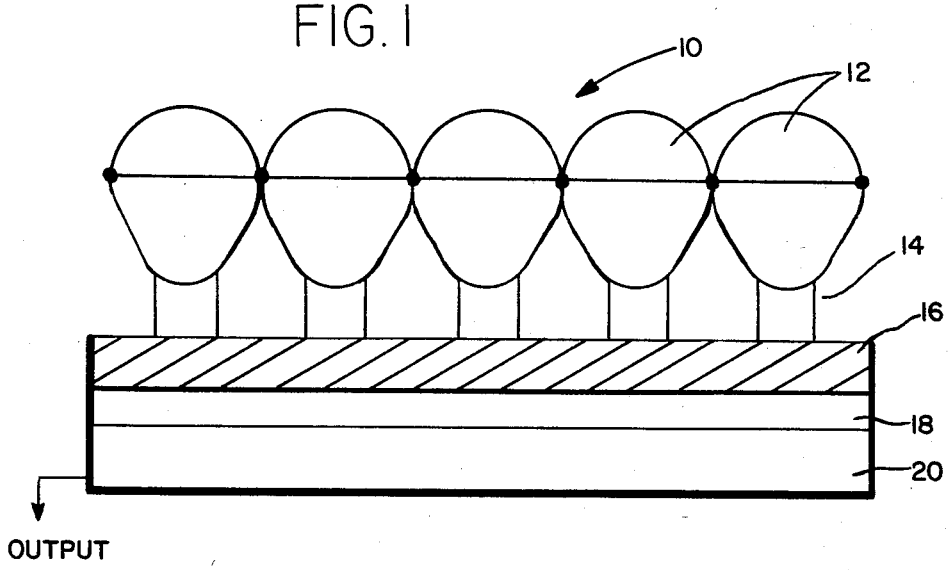
FIG. 1 is a schematic representation of an optical system which incorporates therein a multiplicity of the high efficiency fiber-shaped detectors of this invention.

Reference is now made to FIG. 1 of the drawing which illustrates in schematic form a typical multiaperture optical array 10 of the type, for example, more specifically described in the above-mentioned U.S. patent application Ser. No. 475,676 and which is incorporated herein by reference. Although the detectors of the present invention find their primary utility in optical array 10, it should be noted that the use of the detectors of the present invention are not limited to this particular optical array but are capable of being used in any optical system in which it is desirable to ascertain either intensity, angularity of input, or the alignment of an incoming beam of electromagnetic radiation.

Still referring to FIG. 1 of the drawings, the optical array 10 is formed of a plurality of lenses 12, tubular supports 14, a detection layer 16, a correlation layer 18 and a processing layer 20. In such an optical system each individual lens 12 forms an image on the detection layer 16. The detection layer 16 contains a plurality of the individual detectors 22 of the present invention. One such detector 22 is illustrated in exaggerated fashion in FIG. 2. A clearer showing of detector 22 making up the present invention as well as modified versions thereof are set forth in FIGS. 3-9 of the drawings.

Figure 2:
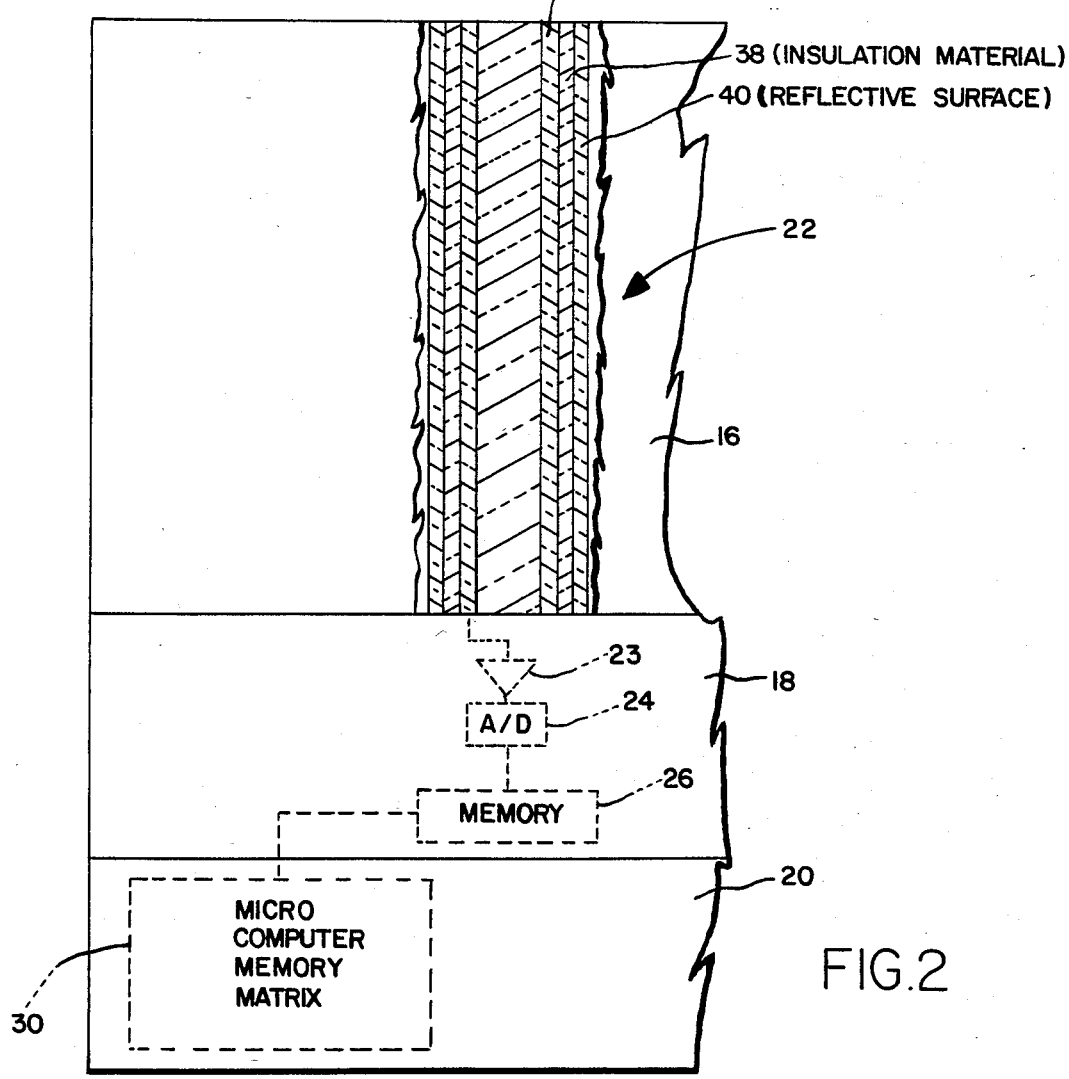
FIG. 2 is a schematic representation of a portion of the optical system depicted in FIG. 1 and which illustrates in exaggerated cross-section one of the high efficiency fiber-shaped detectors of the present invention.

In a typical multiaperture optical array 10 as depicted in FIGS. 1 and 2 of the drawings, generally there are approximately 100 detectors 22 per lens 12 situated within detection layer 16. The correlation layer 18 is a large scale integration (LSI) structure which contains the necessary amplifier 23, analog/digital converter 24 and memory element 26 for each detector 22. The output from each detector 22 is amplified and converted in a number which is stored in the respective memory element 26.

As illustrated more clearly in FIG. 2 of the drawings, amplifier 23, A/D converter 24, and memory element 26 are physically located under each detector 22 in the correlation layer 18. Certain detectors 22 will view the same location in space and are referred to as "equivalent" detectors. Therefore, the content of the memory elements 26 of "equivalent" detectors 22 need to be added and are connected with a wire (hard wired instruction) in the correlation layer 18.

The results of all these additions are stored in a memory matrix 30 (a regular computer core) which is physically located in the processing layer 20. The contents of this memory matrix 30 can be accessed and rearranged using state-of-the-art circuitry, as any conventional microprocessor would perform. Therefore, the processing layer 20 contains similar circuitry, as state-of-the-art microprocessors. The circuitry can perform image evaluation on the contents of the memory matrix 30. It should be realized that a more detailed description of the multiaperture array 10 is not provided since such a multiaperture optical array 10 is only included within the description of the present invention to set forth the environment in which the above-referred to detector 22 of the present invention is utilized. However, U.S. patent application Ser. No. 475,676 provides a more detailed description of multiaperture optical array 10.

Figure 3:
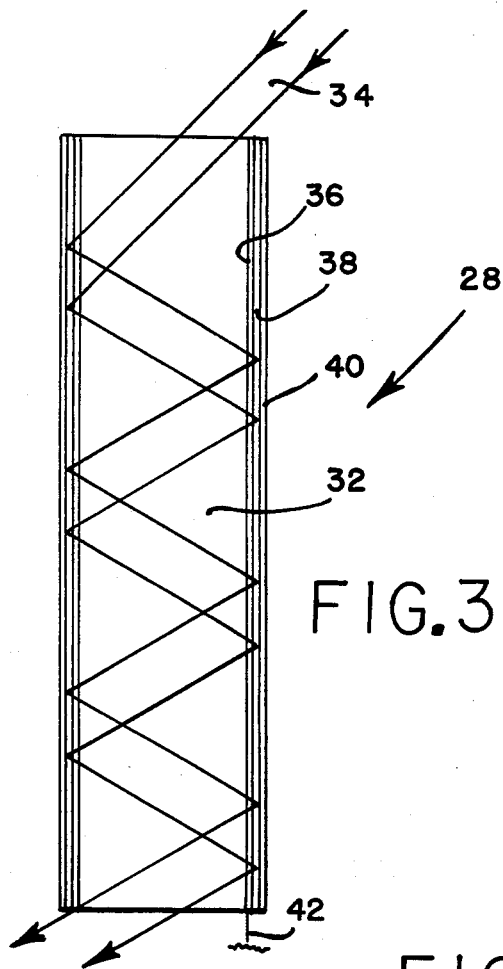
FIG. 3 is a schematic representation of the high efficiency fiber-shaped detector of the present invention illustrated in conjunction with a typical optical path followed by an incoming beam of electromagnetic radiation.
Figure 4:
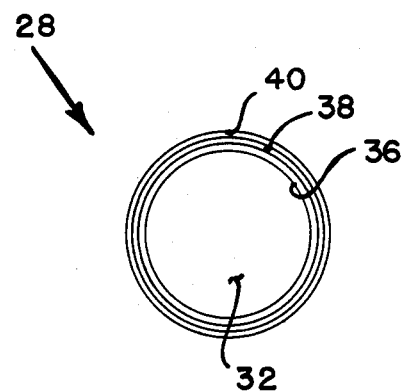
FIG. 4 is a plan view of the high efficiency fiber-shaped detector of the present invention.

Reference is now made to FIGS. 3 and 4 of the drawings for a clearer illustration of detector 22. As seen therein detector 22 includes a cylindrically-shaped, transparent central core 32, preferably in the form of an optical fiber, transparent to the wavelength of an incoming beam of electromagnetic radiation 34. The transparent core 32 has deposited thereon by any suitable method such as vacuum deposition an extremely thin photosensitive layer 36 which completely surrounds the circumference of cylindrically-shaped transparent core 32. Positioned thereover is a thin transparent insulation material 38, generally in the form of a plastic. Vacuum deposited upon insulation material 38 is a thin silvered or mirrored surface or layer 40. With such an arrangement it is possible to reliably ascertain whether an incoming electromagnetic beam of radiation 34 has entered the transparent core 32 of detector 28 by detecting its intensity. The typical diameter of detector 22 is approximately 100 micrometers.

In use, a great many of these detectors 22 are adhered together to form detection layer 18. The output from the photosensitive layer 36 of detector 22 feeds amplifier 23 within correlation layer 18 by means of an electrical connection 42 running from the photosensitive layer 36 thereto. The output of amplifier 23 is analog to digital converted by analog/digital converter 24 and read into memory 26. All memories in the correlation layer 18 are accessed by memory matrix 30 located within processing layer 20. Amplifier 23, analog/digital converter 24 and memory element 26 are fabricated in accordance with very large scale integrated circuit techniques and are physically positioned beneath each of the detectors 22.

Referring once again to FIG. 3 of the drawings, as the incoming beam of electromagnetic radiation 34 enters transparent core 32 of detector 22 it passes through photosensitive layer 36 in which part of its energy is converted into an electrical signal. The remainder of its energy is reflected by reflecting layer 40 and reenters transparent core 32, transverses it, and interacts with photosensitive layer 36 once again. In this manner the photosensitive area of detector 28 is perceived by electromagnetic beam 34 as being several times larger than the area which is available for beam intersection. Consequently, this ensures high detection efficiency at maximum resolving power. In addition, it allows for the construction of a detector 22 which is extremely small since the beam 34 of electromagnetic radiation is reflected through the photosensitive layer 36 many times during one pass through transparent core 32. The lead 42 which carries the signal from photosensitive layer 36 to amplifier 23 is attached to the lower end of photosensitive layer 36 and, therefore, does not interfere with the collection of electromagnetic radiation.

Figure 5:
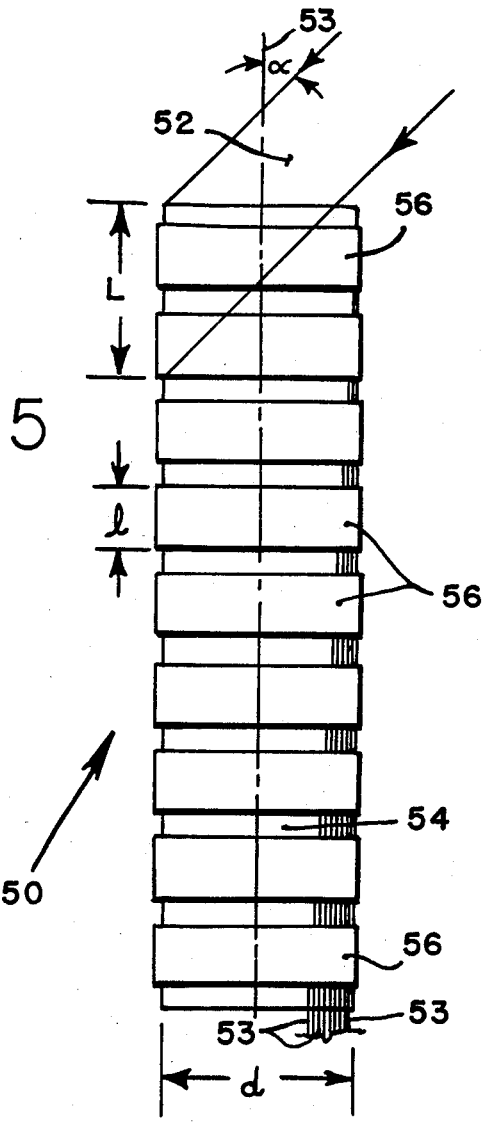
FIG. 5 is a schematic representation of an alternate embodiment of the high efficiency fiber-shaped detector of the present invention and illustrated in conjunction with a typical optical path followed by an incoming beam of electromagnetic radiation.
Figure 6:
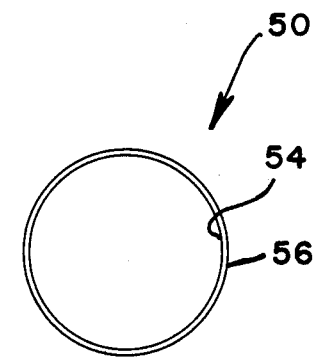
FIG. 6 is a plan view of the high efficiency fiber-shaped detector of FIG. 5.

There are many instances in which ascertaining intensity is not the only criteria which need be established by the detectors of the present invention. Therefore reference is now made to FIGS. 5 and 6 of the drawings in which an alternate embodiment of this invention, referred to as detector 50, is described. With detector 50 it is possible to determine the angular relationship, $\alpha$, followed by the optical path of the incoming beam of electromagnetic radiation 52 with respect to the central or longitudinal axis 53 of detector 50. As with detector 22 detector 50 utilizes a transparent core 54, preferably in the form of an optical fiber, transparent to the wavelength of interest. The major differences between detector 22 and detector 50 reside in the omission of a reflective layer in detector 50 and the photosensitive layer (as illustrated in FIGS. 5 and 6 of the drawings) being made up of a plurality of spaced apart photosensitive segmented layers or segments 56. These segments 56 of photosensitive material are deposited upon the transparent core 54 and are spaced apart from each other a preselected distance along the longitudinal axis 53. In this manner, an incoming beam of electromagnetic radiation 52, entering detector 50 at an angle, $\alpha$, with respect to longitudinal axis 53, will pass through one or more of the photosensitive segments 56. In order to determine the angle, $\alpha$, it is merely necessary to solve the following equation:

$$\tan \alpha = d/L$$

where
 $d$ = the diameter of transparent core 54, and
 $L = \#l$
where
 $l$ = length or width of segment 56; and
 $\#$ = number of segments intersected by beam 52.

In order to ascertain the number, $\#$, of segments 56 of the photosensitive material being intercepted by the beam of electromagnetic radiation 52 each of the segments 56 has a separate connective wire associated therewith. Since each photosensitive segment 56 emits an independent signal, each of the wires 53 are connected to a separate amplifier 23, A/D converter 24 and memory 26.

Figure 7:
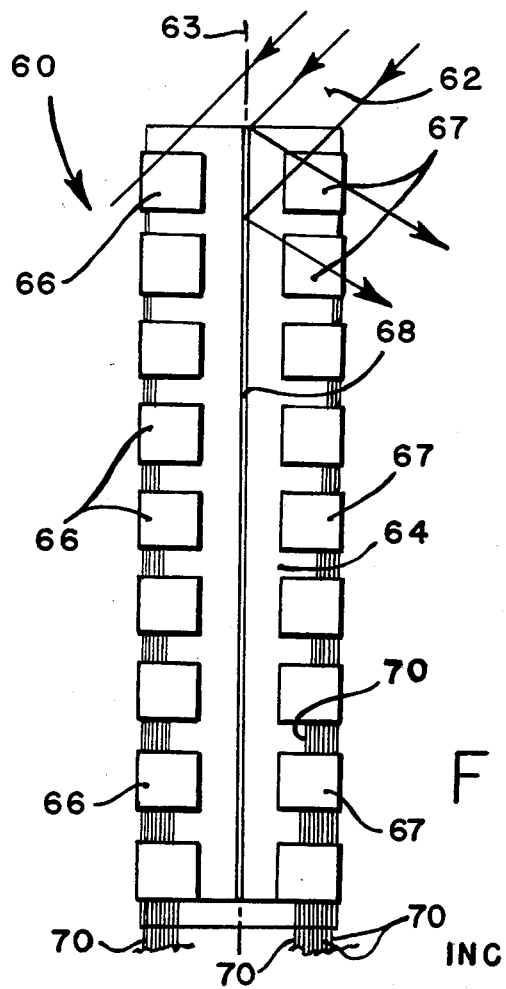
FIG. 7 is a schematic representation of a further alternate embodiment of the high efficiency fiber-shaped detector of the present invention illustrated in conjunction with a typical optical path followed by an incoming beam of electromagnetic radiation.
Figure 8:
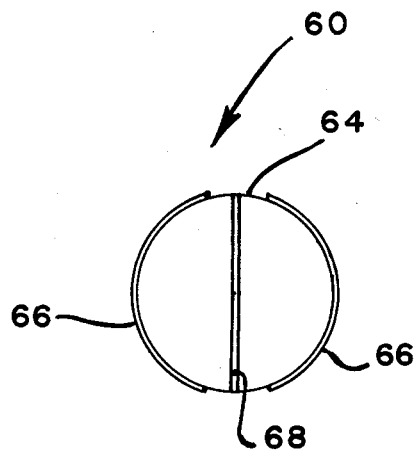
FIG. 8 is a plan view of the high efficiency fiber-shaped detector of this invention of FIG. 7.

A further embodiment of the present invention is in the form of a detector 60 described with respect to FIGS. 7 and 8 of the drawings. Detector 60 is utilized when it is necessary to quickly determine if the incoming beam 62 of electromagnetic radiation is, in fact, optically aligned along the longitudinal axis 63 of detector 60. Such a detector 60 is made up of a transparent core 64, preferably in the form of an optical fiber, transparent to the wavelength of beam 62. Transparent core 64 has deposited thereon a series of adjacent semi-circular segments 66 and 67 made of photosensitive material. Each of a pair of adjacent, semi-circular layers or segments 66 and 67 are spaced apart from a juxtaposed pair of semi-circular segments 66 and 67 by a preselected distance in the longitudinal direction. In addition, each of the semi-circular segments 66 and 67 are separated from each other along the circumference of the transparent core 64. Interposed within transparent core 64 and lying along the centrally extending longitudinal axis 63 of core 64 is a reflective wall or surface 68 which is utilized in a manner more fully described hereinbelow. Separate connective wires 70 are utilized to invididually interconnect each of the semi-circular segments 66 and 67 of photosensitive material to, for example, separate amplifier 23, A/D converter 24 and memory 26 in order to ascertain whether or not the beam 62 of electromagnetic radiation has passed through particular photosensitive segments.

Under conditions of absolute alignment along the centrally extending longitudinal axis 63 of detector 60 there will be either no electrical signal emanating from leads or wires 70 when no contact is made with respective photosensitive segments 66 and 67 or identical signals when all of the photosensitive segments 66 and 67 are equally intercepted by beam 62. In the case, however, as illustrated in FIG. 7 of the drawings when the beam 62 of electromagnetic radiation enters detector 60 at an angle (out of alignment) with respect to longitudinal axis 63 then a portion of that beam of electromagnetic radiation will be intercepted by the mirrored surface 68 as illustrated in FIG. 7 and reflected back through juxtaposed photosensitive segments 67. The remainder of the beam 62 of electromangetic radiation will continue to pass through only photosensitive segments 66 and not be relfected by surface 68. Consequently, it is apparent that some of the segments 67 will receive a greater amount of electromagnetic radiation passing therethrough than segments 66. If such action occurs, it is easily ascertained that beam 62 has entered detector 60 out of alignment with the centrally extending longitudinal axis 63 thereof.

Figure 9:
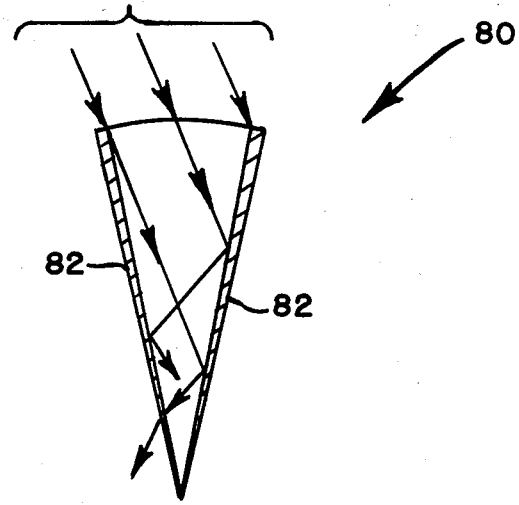
FIG. 9 is a schematic representation of a modified design which can be used with the high efficiency fiber-shaped detectors of this invention.

Although this invention has been described with reference to particular embodiments, it will be understood that this invention is also capable of further and other embodiments within the spirit and scope of the appended claims. For example, it should be further realized that although all of the above detectors 22, 50 and 60 are generally in a cylindrically-shaped configuration, in some instances it may be desirable that a plurality of these detectors of the present invention be formed in an "eye ball" configuration. In such a case each of the detectors can be made of a wedge-shaped configuration as illustrated in FIG. 9 of the drawings. Detector 80 shown therein has the photosensitive material 82 deposited on the outer wedge-shaped surfaces. With such a configuration when the plurality of detectors 80 are adhered to one another the overall configuration is similar to that of an "eye ball."

I claim:

1. A high efficiency fiber-shaped detector comprising:
   a longitudinally extending core having a first end for receiving an incoming beam of electromagnetic radiation and a second end disposed a preselected distance from said first end, said core being made of a material transparent to the wavelength of said incoming beam of electromagnetic radiation;
   photosensitive means circumscribing the exterior of said core for receiving said incoming beam of electromagentic radiation and converting said received electromagnetic radiation into an electrical signal;
   an insulating layer of material deposited on said photosensitive means;
   a reflecting layer of material deposited on said insulating layer of material whereby said reflecting layer of material is capable of reflecting said incoming beam of electromagnetic radiation through said photosensitive means; and
   means connected between said photosensitive means and a processing means for transmitting said electrical signal to said processing means whereby said detector provides information relating to said incoming beam of electromagnetic radiation.

2. A high efficiency fiber-shaped detector as defined in claim 1 wherein said core is made of a cyclindrical configuration.

3. A high efficiency fiber-shaped detector as defined in claim 2 wherein said core is an optical fiber.

4. A high efficiency fiber-shaped detector comprising:
   a longitudinal extending core having a first end for receiving an incoming beam of electromagnetic radiation and a second end disposed a preselected distance from said first end, said core being made of a material transparent to the wavelength of said incoming beam of electromagnetic radiation;
   photosensitive means in be form of a plurality of photosensitive segments circumscribing said core, each of said photosensitve segments being spaced apart from one another in the longitudinal direction and capable of receiving said incoming beam of electromagnetic radiation and converting said received electromagnetic radiation into an electrical signal; and
   means connected between each of said photosensitive segments and a processing means for transmitting said electrical signal to said processing means whereby said detector provides information relating to the angle at which said beam of electromagnetic radiation enters said detector.

5. A high efficiency fiber-shaped detector as defined in claim 4 wherein said core is made of a cylindrical configuration.

6. A high efficiency fiber-shaped detector as defined in claim 5 wherein said core is an optical fiber.

7. A high efficiency fiber-shaped detector comprising:
   a longitudinally extending core having a first end for receiving an incoming beam of electromagnetic radiation and a second end disposed a preselected distance from said first end, said core being made of a material transparent to the wavelength of said incoming beam of electromagnetic radiation;

photosensitive means in the form of a plurality of longitudinally, spaced apart pairs of semicircular, juxtaposed photosensitive segments, each of said semicircular, photosensitive segments partially circumscribing the exterior of said core and capable of receiving said incoming beam of electromagnetic radiation and converting said received electromagnetic radiation into an electrical signal; and means connected between each of said semicircular, photosensitive segments and a processing means for transmitting said electrical signal to said processing means whereby said detector provides information relating to the alignment of said incoming beam of electromagnetic radiation with respect to said longitudinally extending core.

8. A high efficiency fiber-shaped detector as defined in claim 7 further comprises a central, longitudinally extending reflective surface interposed between said juxtaposed semicircular, photosensitive segments.

9. A high efficiency fiber-shaped detector as defined in claim 8 wherein said core is made of a cylindrical configuration.

10. A high efficiency fiber-shaped detector as defined in claim 9 wherein said core is an optical fiber.

* * * * *